(12) United States Patent
Kim et al.

(10) Patent No.: US 12,200,070 B2
(45) Date of Patent: Jan. 14, 2025

(54) METHOD AND APPARATUS FOR TRANSMITTING MOBILE EDGE COMPUTING APPLICATION

(71) Applicant: SAMSUNG ELECTRONICS CO., LTD., Suwon-si (KR)

(72) Inventors: Heejung Kim, Suwon-si (KR); Changbae Yoon, Suwon-si (KR); Chihyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/952,679

(22) Filed: Sep. 26, 2022

(65) Prior Publication Data

US 2023/0021063 A1 Jan. 19, 2023

Related U.S. Application Data

(63) Continuation of application No. PCT/KR2021/001724, filed on Feb. 9, 2021.

(30) Foreign Application Priority Data

Mar. 25, 2020 (KR) .................. 10-2020-0036440

(51) Int. Cl.
H04L 67/00 (2022.01)
G06F 8/61 (2018.01)
H04L 41/0823 (2022.01)

(52) U.S. Cl.
CPC ............... *H04L 67/34* (2013.01); *G06F 8/61* (2013.01); *H04L 41/0823* (2013.01)

(58) Field of Classification Search
CPC ......... H04L 67/00; H04L 67/04; H04L 67/16; H04L 67/18; H04L 67/34; H04L 67/51;
(Continued)

(56) References Cited

U.S. PATENT DOCUMENTS 9,432,794 B2 8/2016 Agrawal et al.
9,942,748 B2 4/2018 Zhu et al.
(Continued)

FOREIGN PATENT DOCUMENTS

JP 2019-121848 7/2019
KR 10-2018-0047070 5/2018
(Continued)

OTHER PUBLICATIONS

Mach, Pavel, and Zdenek Becvar. "Mobile edge computing: A survey on architecture and computation offloading." IEEE communications surveys & tutorials 19, No. 3 (2017): 1628-1656. (Year: 2017).*

(Continued)

*Primary Examiner* — James N Fiorillo

(74) *Attorney, Agent, or Firm* — Nixon & Vanderhye, P.C.

(57) ABSTRACT

A method, performed by an electronic device, of transmitting a mobile edge application, includes obtaining information related to an execution environment of at least one pre-installed mobile edge application, receiving an installation request for a new mobile edge application, determining a mobile edge computing host for installing the new mobile edge application, based on the information related to the execution environment and the requirement information related to an execution environment of the new mobile edge application, and transmitting the new mobile edge application to the determined mobile edge computing host.

16 Claims, 13 Drawing Sheets

(58) Field of Classification Search
CPC ... H04L 67/125; H04L 67/148; H04L 67/289;
H04L 67/327; H04L 41/0823; H04L
41/5093; H04L 61/6054; H04L 47/82;
H04L 47/803; H04L 43/0811; H04L
45/24; H04L 45/74; G06F 9/50; G06F
9/505; G06F 9/4416; G06F 9/5027; G06F
9/5055; G06F 8/61; G06F 8/65; G06F
11/30; G06F 11/2247; G06F 11/3051;
H04W 21/02; H04W 4/60; H04W
52/0264; H04W 8/18; H04W 28/0205;
H04W 36/0033; H04W 36/0061
USPC .......................................................... 709/221
See application file for complete search history.

(56) References Cited

U.S. PATENT DOCUMENTS

| | | | |
|---|---|---|---|
| 10,484,451 B2 * | 11/2019 | Rao | H04L 67/289 |
| 10,834,202 B2 * | 11/2020 | Wang | H04L 67/563 |
| 11,115,336 B2 * | 9/2021 | Sabella | H04L 47/822 |
| 11,297,171 B2 * | 4/2022 | Chun | H04L 69/24 |
| 11,611,471 B2 * | 3/2023 | Ramasubramani | H04L 67/34 |
| 2016/0232026 A1 | 8/2016 | Cropper et al. | |
| 2016/0366244 A1 | 12/2016 | Chiu et al. | |
| 2018/0109590 A1 * | 4/2018 | Rao | H04L 67/289 |
| 2018/0159765 A1 * | 6/2018 | Shi | H04L 45/74 |
| 2018/0183855 A1 * | 6/2018 | Sabella | G06F 9/5072 |
| 2018/0351824 A1 | 12/2018 | Giust et al. | |
| 2019/0026450 A1 * | 1/2019 | Egner | G06F 21/44 |
| 2019/0042318 A1 * | 2/2019 | Ljung | H04W 8/26 |
| 2019/0045409 A1 * | 2/2019 | Rasanen | H04W 88/16 |
| 2019/0053108 A1 * | 2/2019 | Trang | H04W 36/0033 |
| 2019/0108052 A1 | 4/2019 | Kaplan et al. | |
| 2019/0158606 A1 * | 5/2019 | Guim Bernat | H04W 40/18 |
| 2019/0191344 A1 * | 6/2019 | Wen | H04W 36/0061 |
| 2019/0268812 A1 * | 8/2019 | Li | H04W 36/04 |
| 2020/0099742 A1 * | 3/2020 | Puente Pestaña | H04L 67/52 |
| 2020/0169609 A1 * | 5/2020 | Wang | H04W 4/60 |
| 2021/0306281 A1 * | 9/2021 | Vilgelm | H04L 47/781 |
| 2022/0014595 A1 | 1/2022 | Lee et al. | |
| 2022/0038902 A1 * | 2/2022 | Mueck | G06F 21/57 |
| 2022/0206776 A1 * | 6/2022 | Takahashi | G06F 9/45558 |
| 2022/0332350 A1 * | 10/2022 | Jha | B60W 60/0017 |
| 2022/0353788 A1 * | 11/2022 | Zhou | H04W 40/248 |
| 2022/0382534 A1 * | 12/2022 | Jeong | G06F 8/65 |
| 2023/0315521 A1 * | 10/2023 | Hong | G06F 9/5016 718/102 |
| 2023/0319147 A1 * | 10/2023 | Hu | H04W 28/10 455/414.1 |

FOREIGN PATENT DOCUMENTS

| | | |
|---|---|---|
| KR | 10-2020-0007634 | 1/2020 |
| WO | 2018/095537 | 5/2018 |

OTHER PUBLICATIONS

Search Report dated May 18, 2021 in counterpart Intrenational Patent Application No. PCT/KR2021/001724.
Written Opinion dated May 18, 2021 in counterpart Intrenational Patent Application No. PCT/KR2021/001724.
Dario Sabella et al., "Mobile-Edge Computing Architecture: The role of MEC in the Internet of Things," IEEE Consumer Electronics Magazine, vol. 5, Issue 4, Sep. 22, 2016, 10 pages.
Shanti Chilukuri et al., "RainCloud—Cloudlet Selection for Effective Cyber Foraging", 2017 IEEE Wireless Communications and Networking Conference (WNCC), May 11, 2017, 8 pages.
ETSI GS MEC 003 V2.1.1, "Multi-access Edge Computing (MEC); Framework and Reference Architecture," Jan. 2019, 21 pages.
ETSI GS MEC 010-2 V1.1.1, Mobile Edge computing (MEC); Mobile Edge Management; Part 2: Application lifecycle, rules and requirements management, Jul. 2017, 48 pages.
Extended Search Report dated Jan. 30, 2023 in counterpart European Patent Application 21774866.4.
Mach, Pavel et al., "Mobile Edge Computing: a Survey on Architecture and Computation Offloading," IEEE Communications Surveys & Turorials, vol. 19, No. 3, Mar. 15, 2017, pp. 1628-1656.
Communication pursuant to Article 94(3) EPC dated May 6, 2024 in European Patent Application No. 21774866.4.
Office Action dated Sep. 28, 2024 in KR Application No. 10-2020-0036440 and English-language machine translation.

* cited by examiner

METHOD AND APPARATUS FOR TRANSMITTING MOBILE EDGE COMPUTING APPLICATION

CROSS-REFERENCE TO RELATED APPLICATION(S)

This application is a continuation of PCT/KR2021/001724, filed on Feb. 9, 2021, at the Korean Intellectual Property Receiving Office and claims priority under 35 U.S.C. § 119 to Korean Patent Application No. 10-2020-0036440, filed Mar. 25, 2020, in the Korean Intellectual Property Office, the disclosures of each which are incorporated by reference herein in their entireties.

BACKGROUND

Field

The disclosure relates to a method and apparatus for transmitting a mobile edge computing (for example, multi-access or mobile edge computing (MEC)) application.

Description of Related Art

Recently, an edge computing technology of transmitting data using an edge server has been developed. Edge computing technology may include, for example, multi-access edge computing (MEC) or fog computing (FOC). Edge computing technology is a technology of providing data to an electronic device through a separate server (hereinafter, referred to as an edge server, an MEC server, or an MEC host) provided at a location geographically close to the electronic device, for example, inside a base station or near the base station. For example, an application requiring a low delay time (latency) among at least one application provided in the electronic device may transmit or receive data through an edge server provided at a geographically close location, without passing through a server located in an external data network (DN) (for example, the Internet).

Recently, a service (hereinafter, referred to as an MEC-based service or an MEC service) using the edge computing technology has been proposed. With the progress in studies and development for supporting the MEC-based service, a method of selecting an optimum MEC host to provide a high-quality MEC service to a user has been introduced.

SUMMARY

Provided are a method and apparatus for transmitting a mobile edge computing application.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
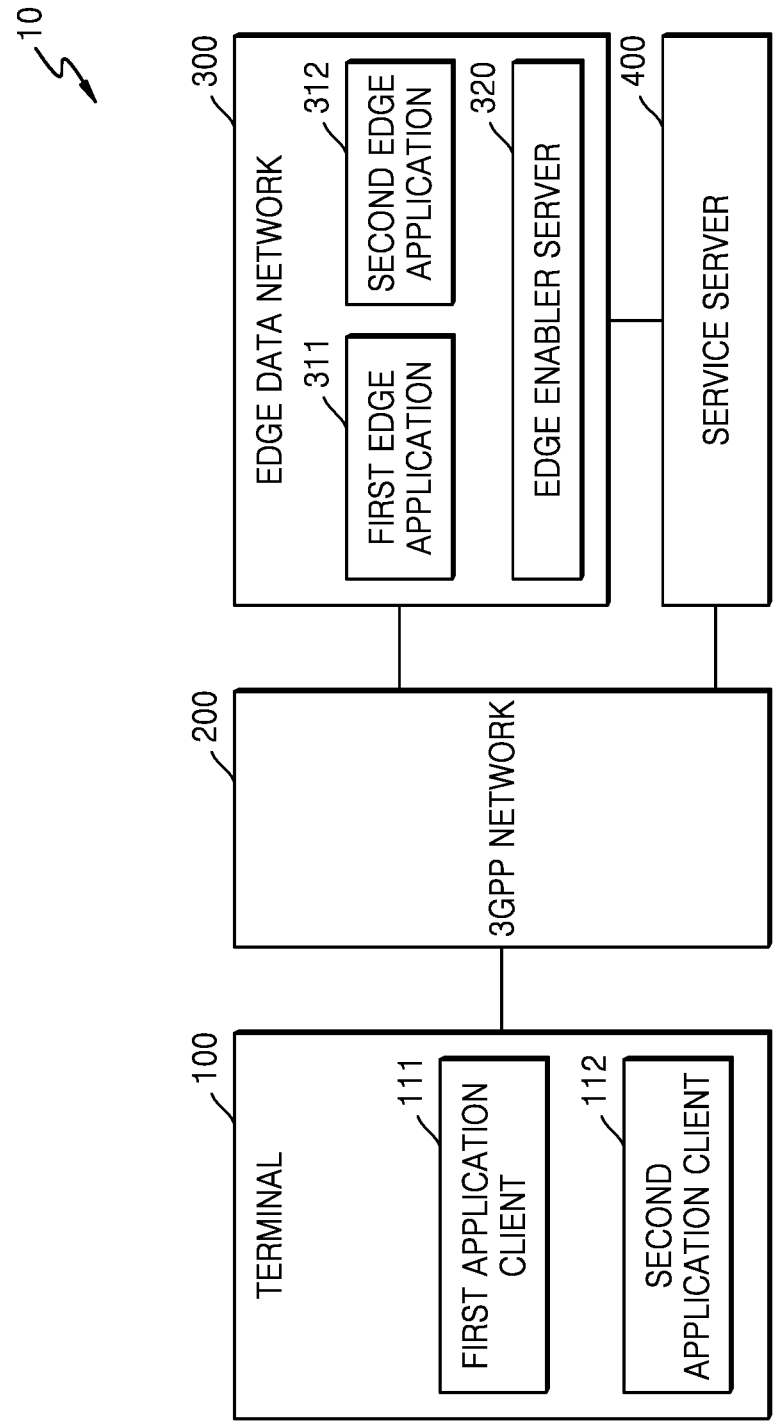
FIG. 1 is a diagram for schematically describing an example network environment supporting a mobile edge computing (MEC)-based service, according to various embodiments.

According to an embodiment of the disclosure, an electronic device includes: a communicator; and at least one processor configured to obtain information related to an execution environment of at least one pre-installed mobile edge application, receive an installation request for a new mobile edge application, determine a mobile edge computing host for installing the new mobile edge application based on the information related to the execution environment and requirement information related to an execution environment of the new mobile edge application, and transmit the new mobile edge application to the determined mobile edge computing host.

According to an embodiment of the disclosure, the at least one processor may be further configured to receive, from at least one external server, the information related to the execution environment and the installation request for the new mobile edge application.

According to an embodiment of the disclosure, the information related to the execution environment of the at least one pre-installed mobile edge application may include at least one of requirement information related to the execution environment of the at least one pre-installed mobile edge application, information about a transmission history, information about network congestion of the mobile edge computing host, or information about an available resource.

According to an embodiment of the disclosure, the information about the transmission history may include change history information of the mobile edge computing host where the at least one mobile edge application is installed.

According to an embodiment of the disclosure, the at least one processor may be further configured to compare the information related to the execution environment with the requirement information related to the execution environment of the new mobile edge application, and determine the mobile edge computing host based on a result of the comparison.

According to an embodiment of the disclosure, the at least one processor may be further configured to determine stability of the execution environment of the at least one pre-installed mobile edge application, based on the information related to the execution environment, and determine the mobile edge computing host based on the stability and the requirement information related to the execution environment of the new mobile edge application.

According to an embodiment of the disclosure, the at least one processor may be further configured to determine an idle resource of a mobile edge computing host of the at least one pre-installed mobile edge application, based on the information related to the execution environment, and determine the mobile edge computing host based on the idle resource and the requirement information related to the execution environment of the new mobile edge application.

According to an embodiment of the disclosure, the at least one processor may be further configured to digitize the information related to the execution environment and the requirement information related to the execution environment of the new mobile edge application respectively into data, and determine the mobile edge computing host based on the digitized data.

According to an embodiment of the disclosure, the at least one processor may be further configured to generate a data comparison list based on the digitized data, and determine the mobile edge computing host based on the data comparison list.

According to an embodiment of the disclosure, the at least one processor may be further configured to obtain information related to the execution environment of the transmitted new mobile edge application, determine a mobile edge computing host for reinstalling the new mobile edge application, based on the information related to the execution environment of the at least one pre-installed mobile edge application and the information related to the execution environment of the transmitted new mobile edge application, and retransmit the new mobile edge application to the determined mobile edge computing host.

According to an embodiment of the disclosure, provided is a method, performed by an electronic device, of transmitting a mobile edge application. The method, performed by an electronic device, of transmitting a mobile edge application, includes: obtaining information related to an execution environment of at least one pre-installed mobile edge application; receiving an installation request for a new mobile edge application; determining a mobile edge computing host for installing the new mobile edge application, based on the information related to the execution environment and the requirement information related to an execution environment of the new mobile edge application; and transmitting the new mobile edge application to the determined mobile edge computing host.

According to an embodiment of the disclosure, the obtaining of the information related to the execution environment may include receiving, from at least one external server, the information related to the execution environment, and the receiving of the installation request may include receiving, from the at least one external server, the installation request for the new mobile edge application.

According to an embodiment of the disclosure, the information related to the execution environment of the at least one pre-installed mobile edge application may include at least one of requirement information related to the execution environment of the at least one pre-installed mobile edge application, information about a transmission history, information about network congestion of the mobile edge computing host, or information about an available resource.

According to an embodiment of the disclosure, the information about the transmission history may include change history information of the mobile edge computing host where the at least one mobile edge application is installed.

According to an embodiment of the disclosure, the determining of the mobile edge computing host for installing the new mobile edge application may include: comparing the information related to the execution environment with the requirement information related to the execution environment of the new mobile edge application; and determining the mobile edge computing host based on a result of the comparing.

According to an embodiment of the disclosure, the determining of the mobile edge computing host for installing the new mobile edge application may include: determining stability of the execution environment of the at least one pre-installed mobile edge application, based on the information related to the execution environment; and determining the mobile edge computing host based on the stability and the requirement information related to the execution environment of the new mobile edge application.

According to an embodiment of the disclosure, the determining of the mobile edge computing host for installing the new mobile edge application may include: determining an idle resource of a mobile edge computing host of the at least one pre-installed mobile edge application, based on the information related to the execution environment; and determining the mobile edge computing host based on the idle resource and the requirement information related to the execution environment of the new mobile edge application.

According to an embodiment of the disclosure, the determining of the mobile edge computing host for installing the new mobile edge application may include: digitizing the information related to the execution environment and the requirement information related to the execution environment of the new mobile edge application respectively into data; and determining the mobile edge computing host based on the digitized data.

According to an embodiment of the disclosure, the determining of the mobile edge computing host based on the digitized data may include: generating a data comparison list based on the digitized data; and determining the mobile edge computing host based on the data comparison list.

According to an embodiment of the disclosure, the method may further include: obtaining information related to the execution environment of the transmitted new mobile edge application; determining a mobile edge computing host for reinstalling the new mobile edge application, based on the information related to the execution environment of the at least one pre-installed mobile edge application and the information related to the execution environment of the transmitted new mobile edge application; and retransmitting the new mobile edge application to the determined mobile edge computing host.

Hereinafter, embodiments of the disclosure will be described with reference to accompanying drawings.

In describing the embodiments, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s).

The computer program instructions may be stored in a computer-executable or computer-readable memory (e.g., a non-transitory computer-executable or computer-readable memory) capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s).

The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur in a different order. For example, two blocks shown in succession may in fact be executed substantially concurrently or the blocks may sometimes be executed in the reverse order, depending upon the functionality involved.

Here, the term "unit" used in the embodiments refers, for example, to a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors.

Thus, for example, the term "unit" may refer, for example, to components such as software components, object-oriented software components, class components, and task components, and may include processes, functions, attributes, procedures, subroutines, segments of program code, drivers, firmware, micro codes, circuits, data, a database, data structures, tables, arrays, or variables.

A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

FIG. 1 is a diagram for schematically describing an example network environment supporting a mobile edge computing (MEC)-based service, according to various embodiments.

Referring to FIG. 1, a network environment 10 may include a terminal 100, a 3rd generation partnership project (3GPP) network 200, an edge data network 300, and a service server 400. However, components included in the network environment 10 are not limited to the components illustrated in FIG. 1.

According to an embodiment, each of the components included in the network environment 10 may denote a physical entity unit or denote a software or module unit capable of performing an individual function. Accordingly, the component included in the network environment 10 may be referred to as an entity or a function.

According to an embodiment, the terminal 100 may denote, for example, an apparatus used by a user. For example, the terminal 100 may denote a user equipment (UE), a remote terminal, a wireless terminal, or a user device. Also, the terminal 100 may include any type of device.

According to an embodiment, the terminal 100 may drive (or execute) a plurality of application clients. For example, the terminal 100 may include a first application client 111 and a second application client 112. The plurality of application clients may require different network services based on at least one of a data rate of the terminal 100, a delay time (or a speed) (latency), reliability, the number of terminals 100 accessing a network, a network accessing cycle of the terminal 100, or average data usage. The different network services may include, for example, enhanced mobile broadband (eMBB), ultra-reliable and low latency communication (URLLC), or massive machine type communication (mMTC).

An application client of the terminal 100 may denote a basic application pre-installed in the terminal 100 or an application provided by a third party. In other words, the application client may denote a client application program driven in the terminal 100 for a particular application service. Several application clients may be driven in the terminal 100. At least one of the application clients may be used to provide a service from the edge data network 300 to the terminal 100. For example, the application client is an application installed in and executed by the terminal 100, and may provide a function of transmitting or receiving data through the edge data network 300. The application client of the terminal 100 may denote application software (or a module) executed on the terminal 100 so as to use a function provided by at least one particular edge application.

According to an embodiment, the first and second application clients 111 and 112 of the terminal 100 may perform data transmission with the service server 400 based on a required network service type or perform edge computing-based data transmission with the edge data network 300. For example, when the first application client 111 does not require low latency, the first application client 111 may perform data transmission with the service server 400. As another example, when the second application client 112 requires low latency, the second application client 112 may perform MEC-based data transmission with the edge data network 300. The disclosure is not limited to the above examples, and the terminal 100 may determine whether to transmit or receive data to or from the service server 400 or edge data network 300, based on various conditions other than latency.

According to an embodiment, an application client of the terminal 100 may be referred to as a UE app, an application client, a client application (client app), or a UE application. In the disclosure below, for convenience, the application client of the terminal 100 will be referred to as an application client.

According to an embodiment, the 3GPP network 200 is a wireless communication system following the 3GPP standard, and may provide a wireless communication service to the terminal 100 by being connected to the terminal 100. The 3GPP network 200 may include a radio access network (RAN) and a core network. The 3GPP network 200 may include a 3rd generation (3G) network, a long-term evolution (LTE) network, a long-term evolution advanced (LTE-A) network, or a next-generation network (5th generation (5G) or new radio (NR)). The disclosure is not limited to the above examples, and the 3GPP network 200 of the disclosure may include a network using another communication technology.

According to an embodiment, the edge data network 300 may denote, for example, a server accessed by the terminal 100 to use an MEC service. The edge data network 300 may be arranged inside a base station of the 3GPP network 200 to which the terminal 100 is connected or at a location geographically close to the base station, and provide content that is at least partially the same as content provided by the service server 400. According to an embodiment, MEC may stand for multi-access edge computing or mobile edge computing.

According to an embodiment, the edge data network 300 may be referred to as an MEC server, an MEC host, an edge computing server, a mobile edge host, or an edge computing platform.

According to an embodiment, the edge data network 300 may execute a plurality of edge applications. For example, the edge data network 300 may execute a first edge application 311 and a second edge application 312. According to an embodiment, an edge application may denote an application provided by a third party in the edge data network 300 providing an MEC service. The edge application may be used to form a data session with an application client so as to transmit or receive data related to the application client. In other words, the edge application may form the data session with the application client. According to an embodiment, the data session may denote a communication path formed such that an application client of the terminal 100 and an edge application of the edge data network 300 transmit or receive data.

According to an embodiment, an application of the edge data network 300 may be referred to as an edge application, an MEC application (MEC app), an edge application server, an ME (MEC) app, or an edge application. In the disclosure below, for convenience, the application of the edge data network 300 will be referred to as an edge application.

According to an embodiment, the edge data network 300 may include an edge enabler server 320. According to an embodiment, the edge enabler server 320 may be referred to as a mobile edge computing (MEC) platform, a mobile edge (ME) platform (MEP), or a platform. Details about the edge enabler server 320 will be described below with reference to FIG. 4.

According to an embodiment, the service server 400 may provide content related to an application client of the terminal 100. For example, the service server 400 may provide a service or data required for the terminal 100 to drive (or execute) an application client, and provide, to the edge data network 300, an edge application for providing an MEC service to the application client of the terminal 100. Also, the service server 400 may provide, to the edge data network 300, a service or data required for the terminal 100 to drive (or execute) an application client. The service server 400 may be operated or managed by a content business operator providing content to the terminal 100.

Although not shown in FIG. 1, a data network (DN) may be present between the 3GPP network 200 and the edge data network 300. According to an embodiment, the DN may provide a service (for example, an Internet service or an IP multimedia subsystem (IMS) service) by transmitting or receiving data (or a data packet) to or from the terminal 100 through the 3GPP network 200. For example, the DN may be managed by a communication business operator. According to an embodiment, the edge data network 300 may be connected to the 3GPP network 200 through a DN (for example, a local DN).

According to an embodiment of the disclosure, when first application client 111 or second application client 112 is executed in the terminal 100, the terminal 100 may access the edge data network 300 through the 3GPP network 200 to transmit or receive data for executing an application client. Here, when the data is transmitted from the terminal 100 to the edge data network 300 or from the edge data network 300 to the terminal 100, transmission latency may occur. According to an embodiment, such transmission latency may be referred to as end-to-end transmission latency.

According to an embodiment, when the edge data network 300 transmits data to the terminal 100 through the 3GPP network 200, the edge data network 300 may store only a portion of the data to be transmitted to the terminal 100 or may not store the data. For example, with the diversification of MEC services provided to the terminal 100, the edge data network 300 may not store all pieces of data regarding all MEC services provided to the terminal 100. The edge data network 300 may store only a portion of data to be transmitted to the terminal 100 so as to provide an MEC service for some MEC services, and receive remaining data from the service server 400 and transmit the same to the terminal 100.

Figure 2:
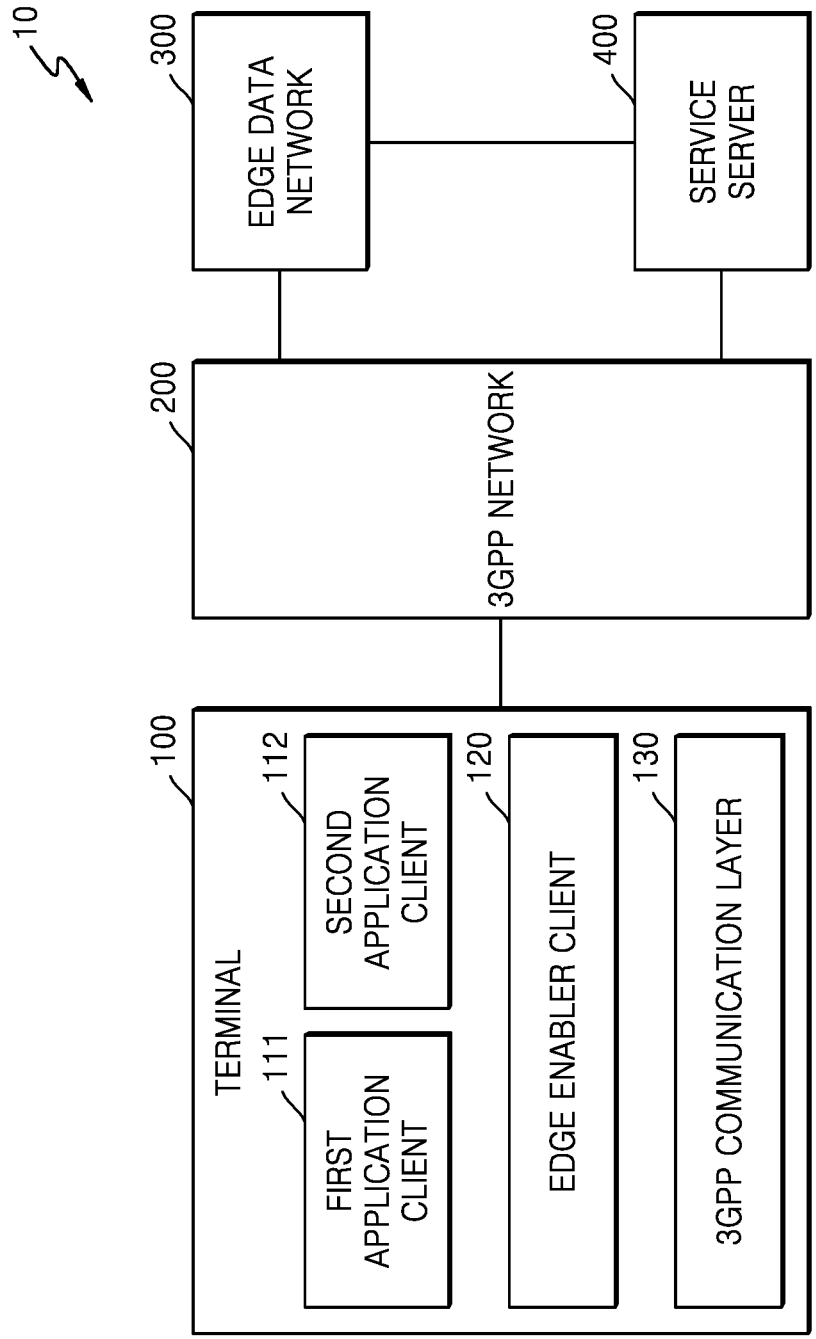
FIG. 2 is a diagram showing an example network environment supporting an MEC-based service based on a terminal, according to various embodiments.

FIG. 2 is a diagram showing an example network environment supporting an MEC-based service based on a terminal, according to various embodiments.

According to an embodiment, the terminal 100 may include the first application client 111, the second application client 112, an edge enabler client 120, and a 3GPP communication layer 130. The first application client 111 and the second application client 112 may denote basic applications pre-installed in the terminal 100 or applications provided by a third party. The first application client 111 and the second application client 112 may perform data transmission with the service server 400 based on a required network service type or perform edge computing-based data transmission with the edge data network 300.

According to an embodiment, the edge enabler client 120 may denote a layer performing operations in the terminal 100 to enable the terminal 100 to use an MEC service. According to an embodiment, the edge enabler client 120 may also be referred to as an MEC enabling layer (MEL). The edge enabler client 120 may perform operations of determining which application client is able to use an MEC service and connecting a network interface such that data of an application client of the terminal 100 may be transmitted to the edge data network 300 providing the MEC service.

Also, the edge enabler client 120 may perform, together with the 3GPP communication layer 130, an operation for establishing a data connection for the terminal 100 to use the MEC service. The 3GPP communication layer 130 may denote, for example, a layer performing a modem operation for using a mobile communication system, and perform operations of establishing a wireless communication for data communication, register the terminal 100 in the mobile communication system, establish a connection in the mobile communication system for data transmission, and transmit or receive data.

Figure 3:
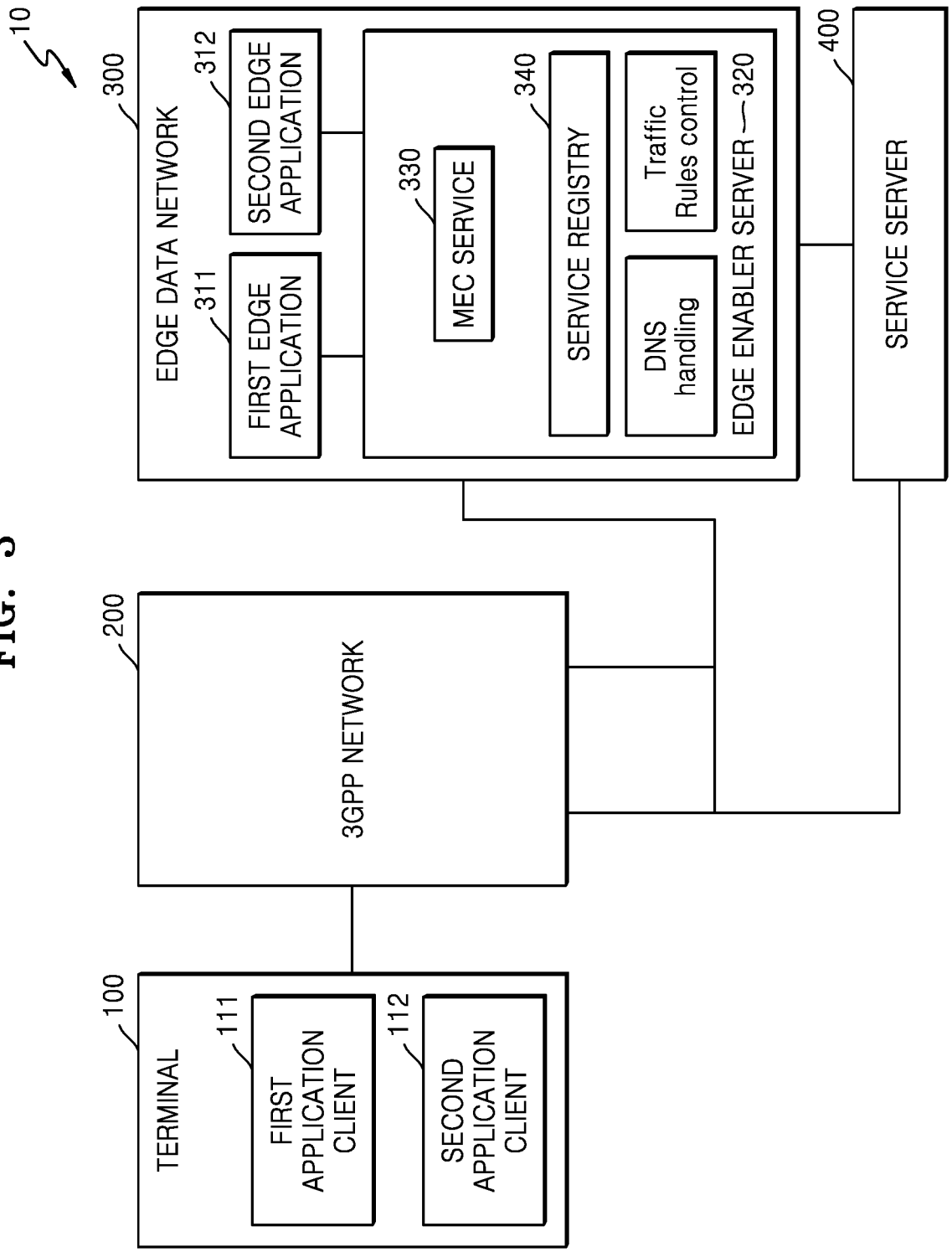
FIG. 3 is a diagram showing an example network environment supporting an MEC-based service based on an MEC server, according to various embodiments.

FIG. 3 is a diagram showing an example network environment supporting an MEC-based service based on an MEC server, according to various embodiments.

According to an embodiment, the terminal 100 may include the first application client 111 and the second application client 112. The terminal 100 may be connected to the 3GPP network 200 to transmit or receive data related to the first application client 111 and second application client 112.

According to an embodiment, the edge data network 300 may provide an MEC service to the terminal 100. In this regard, the edge data network 300 may be arranged inside the base station of the 3GPP network 200 to which the terminal 100 is connected or at a location geographically close to the base station, and provide content that is at least partially the same as content provided by the service server 400.

According to an embodiment, the edge data network 300 may include a plurality of edge applications (the first edge application 311, the second edge application 312, and the edge enabler server 320). However, the configuration of the edge data network 300 is not limited to the configuration shown in FIG. 3.

According to an embodiment, an edge application is an application provided by a third party in the edge data network 300, and may form a data session with an application client to transmit or receive data related to the application client.

According to an embodiment, the edge enabler server 320 may provide a function required to execute an edge application. For example, the edge enabler server 320 may provide a function or environment such that an edge application provides an MEC service to the terminal 100 or the like, or the edge application may use (consume) the MEC service. Also, the edge enabler server 320 may perform traffic control or domain name system (DNS) handling.

According to an embodiment, an MEC service may collectively denote a procedure and information-related service required to use an edge application. The MEC service may be provided or used (consumed) by the edge enabler server 320 or an edge application. For example, the edge application may provide the MEC service to the terminal 100 or use the MEC service provided by the edge enabler server 320 to provide the MEC service to the terminal 100. Also, the edge enabler server 320 may provide, to the edge application, the MEC service that may be used by the edge application to provide the MEC service to the terminal 100. Hereinafter, the MEC service may denote a service provided by the edge data network 300 or edge application to the terminal 100 or a service provided by the edge enabler server 320 and used by the edge application.

According to an embodiment, the edge enabler server 320 may provide the MEC service to the edge application. For example, according to the provided MEC service, the edge enabler server 320 may provide, to the edge application, various types of information (data and content, for example, information about a location of a terminal, caching data, and information about a subscribed service). The edge application may provide the MEC service to the terminal 100 using the MEC service provided by the edge enabler server 320. For example, the edge application may provide the MEC service to the terminal 100, based on pieces of information provided by the edge enabler server 320 as the MEC service. The MEC service provided to the terminal 100 may be a service required for the terminal 100 to drive an application client (for example, provision of data required to drive the application client).

According to an embodiment, the edge enabler server 320 may include an MEC service 330 and a service registry 340. The MEC service 330 may provide a service to edge applications included in the edge data network 300. The MEC service 330 may be implemented as software or a module for performing an individual function. The service registry 340 may provide information about a service(s) available in the edge data network 300. According to an embodiment, the edge enabler server 320 may internally register an edge application when an instance of the edge application is generated (instantiation). The edge enabler server 320 may register (or install) the edge application and store information related to the edge application. The information related to the edge application stored in the edge enabler server 320 may include information about an MEC service to be provided by the edge application to the terminal 100 or the like, information about whether the MEC service is a required service or an option service for the edge application, and the like.

According to an embodiment, the edge application may register a new MEC service in the edge enabler server 320 (service registration) or search for an MEC service registered in the edge enabler server 320. While registering an MEC service in the edge enabler server 320, the edge application may provide, to the edge enabler server 320, information about the MEC service to be registered. The edge enabler server 320 may register the MEC service in the service registry 340.

According to an embodiment, the edge application may update the MEC service registered in the edge enabler server 320. For example, to update the MEC service registered in the edge enabler server 320, the edge application may transmit, to the edge enabler server 320, information about the MEC service to be updated. Here, the edge enabler server 320 may perform updating in the service registry 340 in relation to the updated MEC service.

According to an embodiment, the edge enabler server 320 may transmit, to the edge application in the edge data network 300, information about MEC services registered in the service registry 340. For example, the edge enabler server 320 may transmit, to the edge application, a list of the MEC services registered in the service registry 340. Also, the edge enabler server 320 may transmit, to the edge application, information about availability of MEC services that have been registered or are newly registered in the service registry 340.

According to an embodiment, information indicating that the availability of the MEC services have been changed may be transmitted from the edge enabler server 320 to the edge applications in the edge data network 300. For example, when a new MEC service is registered in the service registry 340 or an MEC service registered in the service registry 340 is updated, and thus availability of an MEC service is changed, the edge enabler server 320 may transmit, to the edge application information indicating that the availability of the MEC service has been changed. Here, the edge enabler server 320 may transmit the information indicating that the availability of the MEC service has been changed to the edge applications that registered, as a required service or optional service, the MEC service of which the availability has been changed.

Figure 4:
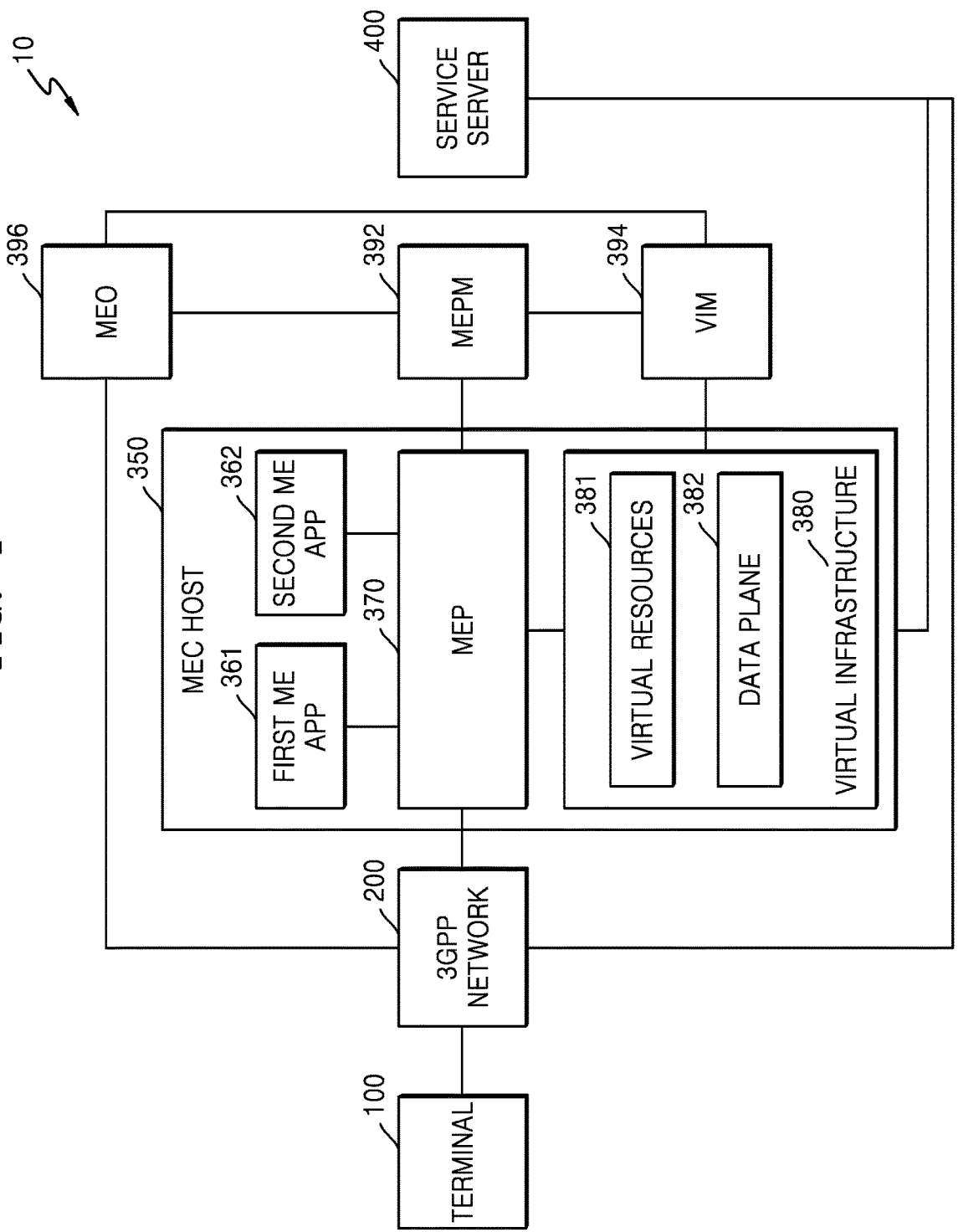
FIG. 4 is a diagram showing an example network environment supporting an MEC-based service, according to various embodiments.

FIG. 4 is a diagram showing an example network environment supporting an MEC-based service, according to various embodiments.

According to an embodiment, components of FIG. 4 may correspond to the components of FIG. 3. For example, an MEC host 350, first and second mobile edge (ME) applications (apps) 361 and 362, and an MEC platform (MEP) 370 of FIG. 4 may respectively correspond to the edge data network 300, the first and second edge applications 311 and 312, and the edge enabler server 320 of FIG. 3. In the descriptions of FIG. 4 below, details overlapping those of FIG. 3 are not repeated.

Referring to FIG. 4, an MEC system may include the MEC host 350, a mobile edge platform manager (MEPM) 392, a virtualization infrastructure manager (VIM) 394, and a mobile edge orchestrator (MEO) 396. However, components included in the MEC system are not limited to the components illustrated in FIG. 4. Each of the components included in the MEC system may denote a physical entity unit or denote a software or module unit capable of performing an individual function. According to an embodiment, the MEC host 350 may include a plurality of ME apps (the first ME app 361 and the second ME app 362), the MEP 370, and a virtual infrastructure 380. However, components of the MEC host 350 are not limited thereto.

According to an embodiment, the virtual infrastructure 380 may include virtual resources 381 and a data plane 382. The virtual infrastructure 380 may provide the virtual resources 381 to an ME app. The virtual resources 381 may include, for example, at least one of a computer resource available to an ME app, a storage resource, or a network resource (for example, a network bandwidth). An ME app of the MEC host 350 may be operated by a virtual machine on the virtual infrastructure 380.

According to an embodiment, the data plane 382 may execute traffic rules received by the MEP 370, and route traffic between an application, a service, a DNS server/proxy, the 3GPP network 200, a local network, and an external network.

According to an embodiment, the MEPM 392 may manage life cycles of ME apps operating in the MEC host 350, and transmit, to the MEO 396, information associated with the life cycles and information related to an execution environment. According to another embodiment, the MEPM 392 may transmit, to the MEP 370, information for operating the ME apps or manage the information. The information for operating the ME apps may include, for example, at least one of rules of an application, a requirement, service approval, or traffic rules.

According to an embodiment, the VIM 394 may allocate, manage, or release the virtual resources 381 of the virtual infrastructure 380, which are required to execute an ME app in the MEC host 350.

According to an embodiment, the MEO 396 may manage and maintain overall functions of data transmission based on the MEC system. The MEO 396 may manage and maintain overall functions of MEC-based data transmission, based on at least one of resources available in the MEC system, an available MEC service, rules and requirements of an application, policy of an operator, or topology. For example, the MEO 396 may select the MEC host 350 suitable to a UE app of the terminal 100, or trigger or terminate instantiation of the UE app.

Here, the UE app of the terminal 100 may require different network services based on at least one of a data rate of the terminal 100, a delay time (or a speed) (latency), reliability, the number of terminals 100 accessing a network, a network accessing cycle of the terminal 100, or average data usage.

The UE app of the terminal 100 may perform data transmission with the service server 400 or perform edge computing-based data transmission with the edge data network 300 or MEC host 350, based on a required network service.

According to an embodiment, whenever the number of network services required by the UE app of the terminal 100 increases, complexity of rules of selecting the suitable MEC host 350 may increase. When network services required by the UE app of the terminal 100 are unable to be represented quantitatively or prioritized due to complexity, an unsuitable MEC host 350 may be selected (or determined).

The disclosure provides a method by which an electronic device 600 (see FIG. 6) determines a suitable edge data network 300 or MEC host 350 so as to provide a high-quality service to a user.

Figure 5:
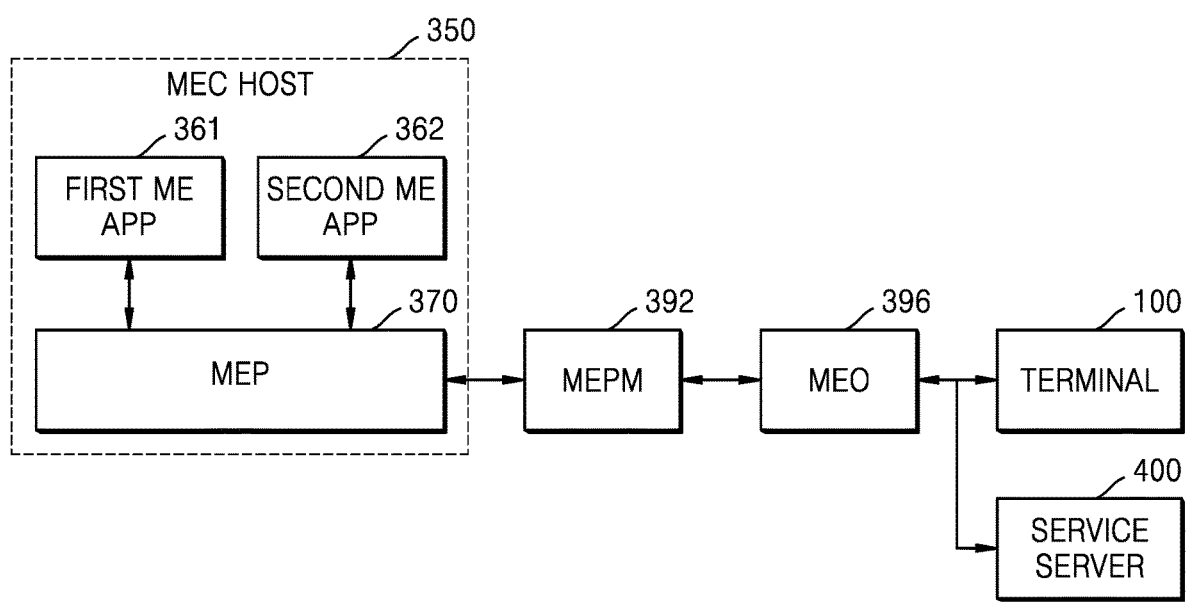
FIG. 5 is a diagram showing an example network environment supporting an MEC-based service by determining a suitable MEC host, according to various embodiments.

FIG. 5 is a diagram showing an example network environment supporting an MEC-based service by determining the suitable MEC host 350, according to various embodiments.

The MEC host 350, the first and second ME apps 361 and 362, and an MEP 370 may respectively correspond to the edge data network 300, the first and second edge applications 311 and 312, and the edge enabler server 320 of FIG. 3. Hereinafter, details about components of FIG. 5, which overlap those in the descriptions of FIGS. 3 and 4, are briefly described.

According to an embodiment, the terminal 100 may denote an apparatus used by a user. The service server 400 may provide content related to an application client of the terminal 100. The MEC host 350 may denote a server accessed by the terminal 100 to use an MEC service. The MEO 396 may manage and maintain overall functions of data transmission based on an MEC system. The MEPM 392 may manage life cycles of ME apps operating in the MEC host 350, and transmit, to the MEO 396, information associated with the life cycles and information related to an execution environment. The first and second ME apps 361 and 362 may denote applications provided by a third party in the MEC host 350 providing the MEC service. The MEP 370 may provide a function required to execute the first and second ME apps 361 and 362.

Figure 6:
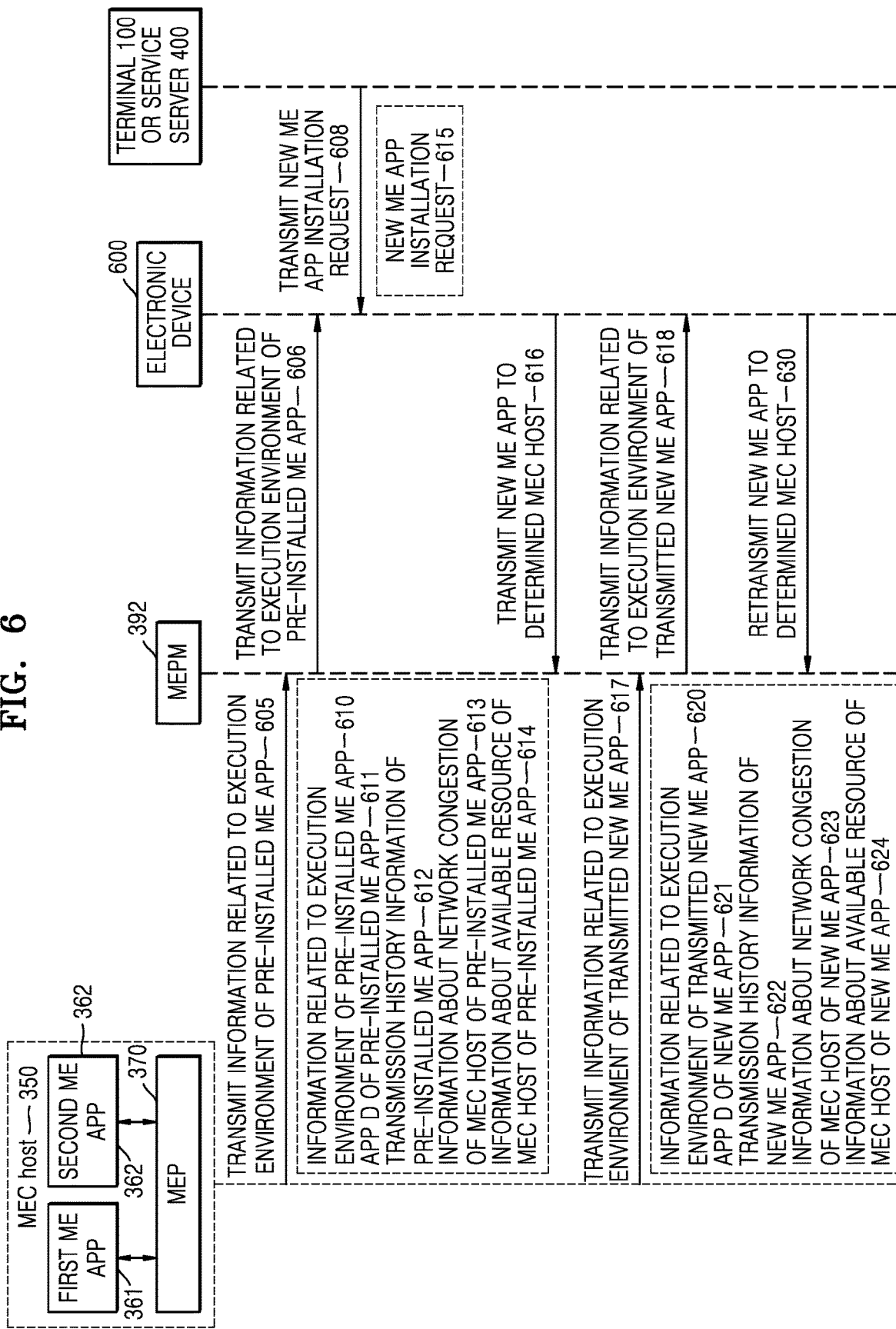
FIG. 6 is a diagram showing example procedures for supporting an MEC-based service by determining a suitable MEC host, according to various embodiments.

FIG. 6 is a diagram showing example procedures for supporting an MEC-based service by determining the suitable MEC host 350, according to various embodiments.

The electronic device 600 may manage and maintain overall functions of data transmission based on an MEC system. For example, the electronic device 600 may be the MEO 396 in a network environment supporting the MEC-based service of FIG. 5.

In operation 605, the MEC host 350 may transmit, to the MEPM 392, information 610 related to an execution environment of a pre-installed ME app. In operation 606, the MEPM 392 may transmit, to the electronic device 600, the information 610 related to the execution environment of the pre-installed ME app.

According to an embodiment of the disclosure, the information 610 related to the execution environment of the pre-installed or pre-registered ME app may include at least one of requirement information (application descriptor (app D)) 611 related to the execution environment of the pre-installed ME app, transmission history information 612 of the pre-installed ME app, information 613 about network congestion of the MEC host 350 of the pre-installed ME app, or information 614 about an available resource of the MEC host 350 of the pre-installed ME app.

According to an embodiment of the disclosure, the app D 611 of the ME app may be information related to an environment required for execution of the ME app. For example, the information related to the environment may include at least one of latency information required to execute the ME app, required resource information, computing power, bandwidth, storage, or information on a service being used.

According to an embodiment of the disclosure, the app D 611 of the ME app may be requirement information about a network service. For example, the requirement information may include at least one of a data rate of the terminal 100, latency (or a speed), reliability, the number of terminals 100 accessing a network, a network access cycle of the terminal 100, or average data usage.

As such, the app D 611 of the ME app includes information (for example, location information) related to a service used for execution of the ME app, and in detail, pieces of information related to the environment required to execute the ME app, and thus similarity of the ME apps may be determined by the electronic device 600 based on the app D 611 of the ME app. For example, regarding vehicle navigation applications, the electronic device 600 may determine ME apps to be similar when pieces of information related to services used to execute the ME apps are the same, i.e., location information, and a difference in latency required for execution, a required resource, computing power, a bandwidth, or storage is equal to or less than a set value.

According to an embodiment of the disclosure, the transmission history information 612 of the pre-installed ME app may denote a history of transmitting an ME app from the MEO 396 or electronic device 600 to the MEPM 392 or MEC host 350 so as to install (or reinstall) the ME app. According to an embodiment, the transmission history information 612 of the pre-installed ME app may include change history information of the MEC host 350 of the pre-installed ME app.

According to an embodiment of the disclosure, even after the ME app is installed in the MEC host 350, the electronic device 600 or MEO 396 may retransmit the ME app to reinstall or relocate the ME app in another MEC host 350 or MEPM 392 after determining that the MEC host 350 where the ME app is installed is not a suitable execution environment for the ME app. Accordingly, when the frequency of reinstalling the ME app is high, the frequency of retransmitting or reinstalling the ME app is high because the MEC host 350 or MEPM 392 where the ME app is installed is not a suitable execution environment. Accordingly, in the execution environment of the ME app, the electronic device 600 may determine that the MEC host 350 or MEPM 392 where the ME app is installed is unstable. On the other hand, when the frequency of retransmitting or reinstalling the ME app is low, the electronic device 600 may determine that the MEC host 350 or MEPM 392 is stable with respect to the execution environment of the ME app. An operation in which the electronic device 600 determines the suitable MEC host 350 will be described in detail with respect to FIGS. 7 through 13.

According to an embodiment of the disclosure, the information 613 about the network congestion of the MEC host 350 of the pre-installed ME app may include, but is not limited to, the number of terminals 100 accessing the MEC host 350, the network access cycle of the terminal 100, the average data usage, in/out network traffic, or the number of ME apps installed in the MEC host 350.

According to an embodiment of the disclosure, the information 614 about the available resource of the MEC host 350 of the pre-installed ME app may include, but is not limited to, a central processing unit (CPU), memory, computing power, or storage of the MEC host 350.

As such, the information 613 about the network congestion of the MEC host 350 of the pre-installed ME app or the information 614 about the available resource of the MEC host 350 of the pre-installed ME app includes information about the MEC host 350 where the ME app may be installed, and thus an idle resource of the MEC host 350 may be determined based on the information 613 about the network congestion of the MEC host 350 of the pre-installed ME app (in/out network traffic) or the information 614 about the available resource of the MEC host 350 of the pre-installed ME app.

According to an embodiment of the disclosure, the information 610 related to the execution environment of the pre-installed ME app may be transmitted from the MEC host 350 or MEPM 392 to the electronic device 600. According to another embodiment of the disclosure, the electronic device 600 may store the information 610 related to the execution environment of the pre-installed ME app.

In operation 608, the terminal 100, an external server (not shown), or the service server 400 may transmit a new ME app installation request 615 to the electronic device 600. The new ME app installation request 615 may include an app D 621 of a new ME app.

According to an embodiment of the disclosure, the electronic device 600 may determine the MEC host 350 for installing the new ME app, based on the information 610 related to the execution environment of the pre-installed ME app and the app D 621 of the new ME app. A detailed operation of the determining will be described with reference to FIG. 7.

In operation 616, the electronic device 600 may transmit the new ME app to the MEPM 392 or MEC host 350 so as to install the new ME app in the determined MEC host 350.

In operation 617, the MEC host 350 may transmit, to the MEPM 392, information 620 related to an execution environment of the transmitted new ME app.

In operation 618, the MEPM 392 may transmit, to the electronic device 600, the information 620 related to the execution environment of the transmitted new ME app. According to an embodiment of the disclosure, the electronic device 600 may store the information 620 related to the execution environment of the transmitted new ME app.

According to an embodiment of the disclosure, the electronic device 600 may determine the MEC host 350 for reinstalling the transmitted new ME app, based on the information 610 related to the execution environment of the pre-installed ME app and the information 620 related to the execution environment of the transmitted new ME app. A detailed operation of the determining will be described with reference to FIG. 13.

In operation 630, the electronic device 600 may retransmit the new ME app to the MEPM 392 so as to reinstall the new ME app in the determined MEC host 350. According to an embodiment of the disclosure, the electronic device 600 may retransmit the new ME app to the determined MEC host 350.

Figure 7:
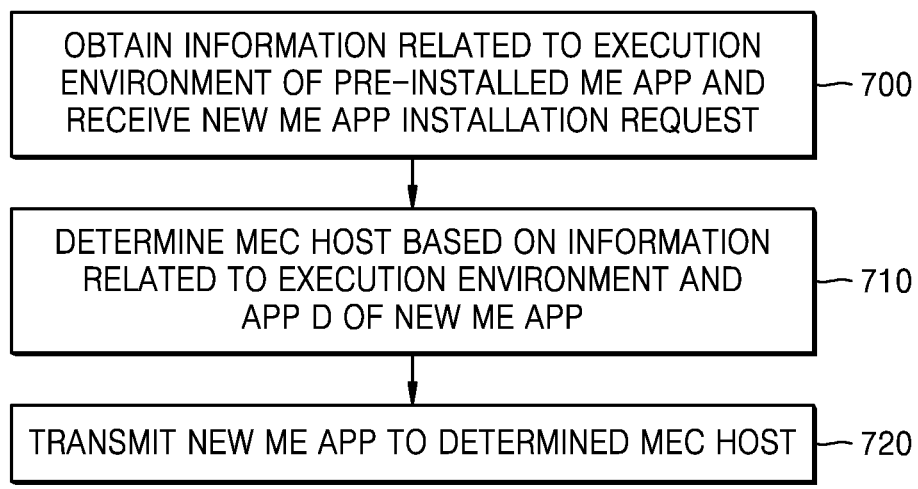
FIG. 7 is a flowchart for describing operations in which an example electronic device determines a suitable MEC host, according to various embodiments.

FIG. 7 is a flowchart for describing operations in which the example electronic device 600 determines the suitable MEC host 350, according to various embodiments.

In operation 700, the electronic device 600 may obtain the information 610 related to the execution environment of the pre-installed ME app and receive the new ME app installation request 615. An operation of obtaining the information 610 related to the execution environment of the pre-installed ME app and an operation of receiving the new ME app installation request 615 may be simultaneously performed or an order of performing the operations may be changed.

According to an embodiment of the disclosure, the operation in which the electronic device 600 obtains the information 610 related to the execution environment of the pre-installed ME app may include receiving the same from the MEC host 350 or MEPM 392. According to an embodiment of the disclosure, because the electronic device 600 may store the information 610 related to the execution environment of the pre-installed ME app, the information 610 related to the execution environment of the pre-installed ME app may not be received from the MEC host 350 or MEPM 392.

Then, in operation 710, the electronic device 600 may determine the MEC host 350 based on the information 610 related to the execution environment of the pre-installed ME app and the app D 621 of the new ME app.

The app D 621 of the new ME app may include information related to an environment required to execute the new ME app. However, it is not possible for an ME app developer to predict all actual execution environments, and there is a limit to including all pieces of information 620 related to an environment required for execution to the app D 621. Accordingly, the MEO 396 may install the new ME app in the MEC host 350 based on the app D 621 of the new ME app, and after the new ME app is installed, reinstall the new ME app in another MEC host 350 through the information related to the execution environment.

When the MEO 396 reinstalls the new ME app, the MEO 396 may revise the app D 621 of the new ME app such that the new ME app may be reinstalled in the suitable MEC host 350. Also, the MEO 396 may add an installation rule for the MEC host 350, based on the app D 621 of the ME app. When the MEO 396 revises the app D 621 of the new ME app or adds a rule, not only time costs and financial costs are consumed, but also complexity of rules may increase. Accordingly, it is desirable to reduce reinstallation of a new ME app and determine the optimum (or better) MEC host 350.

According to an embodiment of the disclosure, the information 610 related to the execution environment of the pre-installed ME app may include at least one of the app D 611 of the pre-installed ME app, the transmission history information 612 of the pre-installed ME app, the information 613 about the network congestion of the MEC host 350 of the pre-installed ME app, or the information 614 about the available resource of the MEC host 350 of the pre-installed ME app. See FIG. 6. The transmission history information 612 of the pre-installed ME app includes the change history information of the MEC host 350 of the ME app, and thus the information 610 related to the execution environment of the pre-installed ME app may denote information related to an actual execution environment (or an execution environment after installation) of the ME app.

In operation 710, the electronic device 600 determines the MEC host 350 for installing the new ME app, based on the information 610 related to the execution environment of the pre-installed ME app and the app D 621 (see FIG. 6) of the new ME app, and thus reinstallation of the new ME app may be reduced and the optimum or better MEC host 350 may be determined.

In operation 720, the electronic device 600 may transmit the new ME app to the determined MEC host 350 to install the new ME app in the determined MEC host 350. According to another embodiment of the disclosure, when the electronic device 600 transmits the new ME app to the MEPM 392, the MEPM 392 may transmit the new ME app to the determined MEC host 350.

Figure 8:
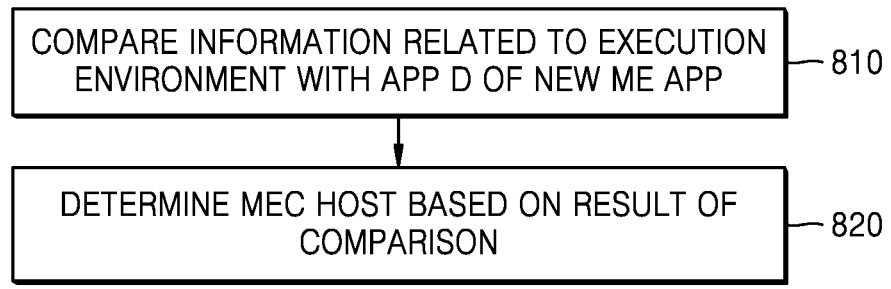
FIG. 8 is a flowchart for describing operations in which an example electronic device determines a suitable MEC host, according to various embodiments.

FIG. 8 is a flowchart for describing operations in which the example electronic device 600 determines the suitable MEC host 350, according to various embodiments. Operations 810 and 820 of FIG. 8 are a concretization of operation 710 of FIG. 7 of determining the MEC host 350 based on the information 610 related to the execution environment of the pre-installed ME app and the app D 621 of the new ME app.

In operation 810, the electronic device 600 may compare the information 610 related to the execution environment of the pre-installed ME app with the app D 621 of the new ME app. The electronic device 600 may compare information among the information 610 related to the execution environment of the pre-installed ME app, which corresponds to the app D 621 of the new ME app, with the app D 621 of the new ME app. For example, the electronic device 600 may compare the pre-installed ME app with the new ME app with respect to each of latency required to execute an ME app, required resource information, computing power, a bandwidth, a storage, and a service used for execution.

As described above, because an app D of an ME app includes information on a service being used, and in detail, pieces of information related to an environment required to execute the ME app, similarity of ME apps may be determined by comparing app Ds of the ME apps.

According to an embodiment of the disclosure, the electronic device 600 may determine a pre-installed ME app, in which information corresponding to the app D 621 of the new ME app from among the information 610 related to the execution environment of the pre-installed ME app differs from the app D 621 of the new ME app by a set value or less, to be similar to the new ME app. According to an embodiment of the disclosure, the electronic device 600 may determine a pre-installed ME app, in which a sum of differences of pieces of corresponding information is equal to or less than the set value, to be similar to the new ME app. Here, the electronic device 600 may determine a pre-installed ME app, in which a weighted sum of the differences of the pieces of corresponding information is equal to or less than the set value, to be similar to the new ME app. For example, a pre-installed ME app, in which a weighted sum obtained by multiplying a coefficient A by a difference in latencies required to execute ME apps and multiplying a coefficient B by a difference in required resources for execution of ME apps is equal to or less than the set value, to be similar to the new ME app.

Also, coefficients of a weighted sum may be provided and learned by each node of a hidden layer of an artificial neural network. The learning of the coefficients of the weighted sum may be performed via supervised learning (for example, k-nearest neighbor (KNN)), unsupervised learning (for example, K-means), or reinforced learning (for example, Q-learning). Details about each learning method are well-known, and thus descriptions thereof are not provided here.

In operation 820, the electronic device 600 may determine the MEC host 350 based on a result of the comparison. The electronic device 600 may determine the MEC host 350 where the pre-installed ME app similar to the new ME app is installed as the MEC host 350 for installing the new ME app. Even when the number of pieces of information included in an app D of an ME app increases, complexity of rules may not increase because the electronic device 600 determines the MEC host 350 through similarity of ME apps. Also, the electronic device 600 may compare app Ds of ME apps and obtain a weighted sum of differences of pieces of corresponding information. Accordingly, even when requirement information related to an execution environment is unable to be quantitatively represented or priority thereof is unable to be determined due to complexity, the electronic device 600 may determine the suitable MEC host 350 by adjusting coefficients.

Figure 9:
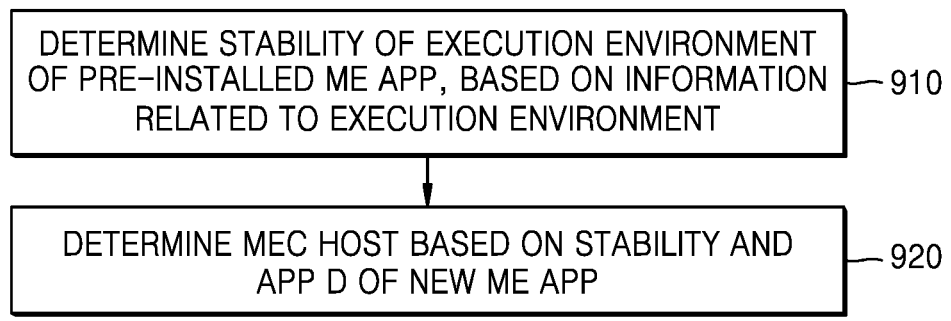
FIG. 9 is a flowchart for describing operations in which an example electronic device determines a suitable MEC host, according to various embodiments.

FIG. 9 is a flowchart for describing principles of operations in which the example electronic device 600 determines the suitable MEC host 350, according to various embodiments. Operations 910 and 920 of FIG. 9 are a concretization of operation 710 of FIG. 7 of determining the MEC host 350 based on the information 610 related to the execution environment of the pre-installed ME app and the app D 621 of the new ME app.

In operation 910, the electronic device 600 may determine stability of the execution environment of the pre-installed ME app, based on the information 610 related to the execution environment of the pre-installed ME app. As described above with reference to FIG. 6, regarding an ME app with low frequency of retransmission or reinstallation, it may be determined that the MEC host 350 or MEPM 392 in which the ME app is installed is stable with respect to an execution environment of the ME app. The electronic device 600 may determine the stability of the execution environment of the pre-installed ME app, based on information related to the execution environment, for example, the transmission history information 612 of the pre-installed ME app.

In operation 920, the electronic device 600 may determine the MEC host 350 based on the stability of the execution environment of the pre-installed ME app and the app D 621 of the new ME app. The electronic device 600 may determine the MEC host 350 of the pre-installed ME app with high stability (low retransmission frequency) as the MEC host 350 for installing the new ME app. Accordingly, the new ME app being reinstalled or relocated in another MEC host 350 or MEPM 392 because the installed MEC host 350 is not a suitable execution environment for the new ME app may be reduced.

According to an embodiment of the disclosure, the electronic device 600 may determine the MEC host 350 with high stability of execution environment from among the MEC hosts 350 of pre-installed ME apps similar to the new ME app, as the MEC host 350 for installing the new ME app. Also, the electronic device 600 may determine the MEC host 350 based on a sum or weighted sum of the similarity and stability of the ME app. As described above, coefficients of the weighted sum may be provided and learned by each node of a hidden layer of an artificial neural network.

Figure 10:
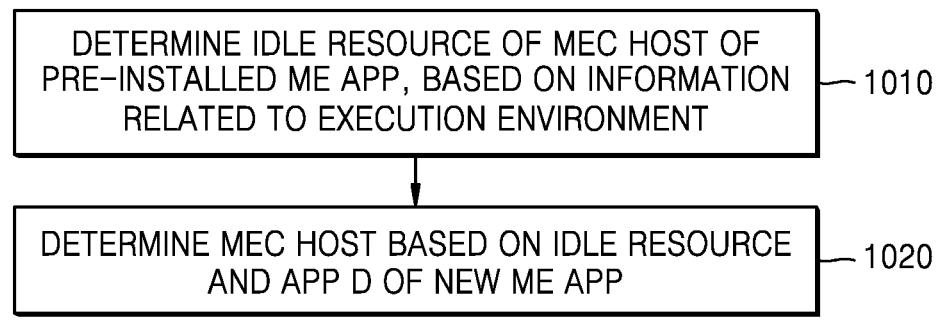
FIG. 10 is a flowchart for describing operations in which an example electronic device determines a suitable MEC host, according to various embodiments.

FIG. 10 is a flowchart for describing principles of operations in which the example electronic device 600 determines the suitable MEC host 350, according to various embodiments. Operations 1010 and 1020 of FIG. 10 are a concretization of operation 710 of FIG. 7 of determining the MEC host 350 based on the information 610 related to the execution environment of the pre-installed ME app and the app D 621 of the new ME app.

In operation 1010, the electronic device 600 may determine an idle resource of the MEC host 350 of the pre-installed ME app, based on information related to a pre-installed execution environment. The electronic device 600 may determine a resource available in the MEC host 350 of the pre-installed ME app, based on the information related to the pre-installed execution environment, for example, information about network congestion or information about an available resource.

In operation 1020, the electronic device 600 may determine the MEC host 350 based on the idle resource and the app D 621 of the new ME app. The electronic device 600 may determine a resource required for execution, based on the app D 621 of the new ME app, and filter the MEC host 350 that possesses an idle resource smaller than the required resource. Accordingly, the new ME app being reinstalled or relocated in another MEC host 350 or MEPM 392 because the installed MEC host 350 is not a suitable execution environment for the new ME app, for example, the resource required for the execution is insufficient, may be reduced.

Figure 11:
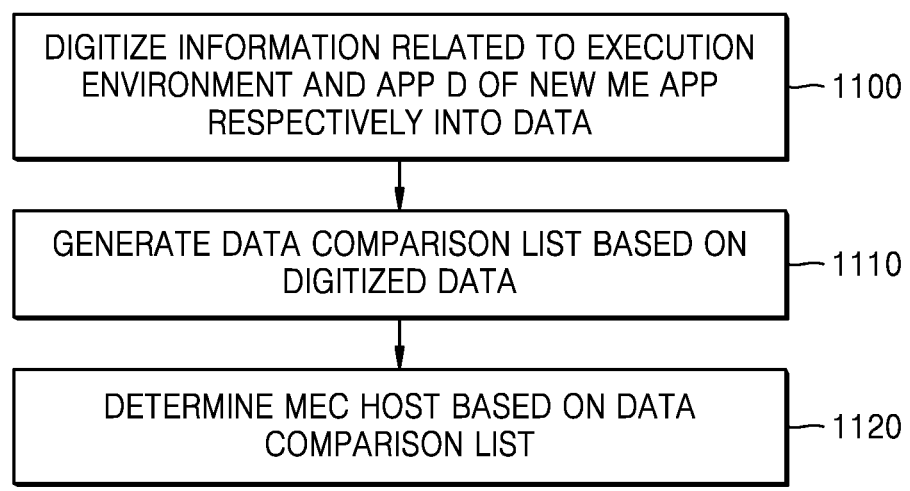
FIG. 11 is a flowchart for describing operations in which an example electronic device determines a suitable MEC host, according to various embodiments.

FIG. 11 is a flowchart for describing operations in which the example electronic device 600 determines the suitable MEC host 350, according to various embodiments. Operations 1100, 1110, and 1120 of FIG. 11 are a concretization of operation 710 of FIG. 7 of determining the MEC host 350 based on the information 610 related to the execution environment of the pre-installed ME app and the app D 621 of the new ME app.

In operation 1100, the electronic device 600 may digitize the information 610 related to the pre-installed execution environment and the app D 621 of the new ME app respectively into data. The electronic device 600 may generate a matrix or array such that pieces of information may be distinguished from each other, and allocate a digitized data value to each component.

In operation 1110, the electronic device 600 may generate a data comparison list based on the digitized data. The data comparison list may be generated, for example, by a sum or weighted sum of differences in digitized data of corresponding information between the pre-installed ME app and the new ME app, so as to determine similarity of ME apps. As described above, coefficients of the weighted sum may be provided and learned by each node of a hidden layer of an artificial neural network.

In operation 1120, the electronic device 600 may determine the MEC host 350 based on the data comparison list. The electronic device 600 may list or sort the data comparison list in an order from high similarity as the sum or weighted sum of the differences in the digitized data of the corresponding information included in the data comparison list is small, and from high stability because retransmission or reinstallation frequency is low. The listing may be performed according to a sorting algorithm, and descriptions about the sorting algorithm will not be provided here because the sorting algorithm is a well-known technology.

According to another embodiment of the disclosure, the electronic device 600 may list the data comparison list in an order from a high sum or weighted sum of similarity and stability that are digitized into data. In this case, as described above, coefficients of the weighted sum may be provided and learned by each node of a hidden layer of an artificial neural network.

According to an embodiment of the disclosure, the electronic device 600 may filter the MEC host 350 that possesses an idle resource smaller than a resource required to execute the new ME app that is digitized into data. According to another embodiment of the disclosure, the electronic device 600 may not include, to the data comparison list, the MEC host 350 that possesses the idle resource smaller than the resource required to execute the new ME app. Accordingly, the filtering or the comparing of the idle resource may be performed before operation 1110.

Figure 12:
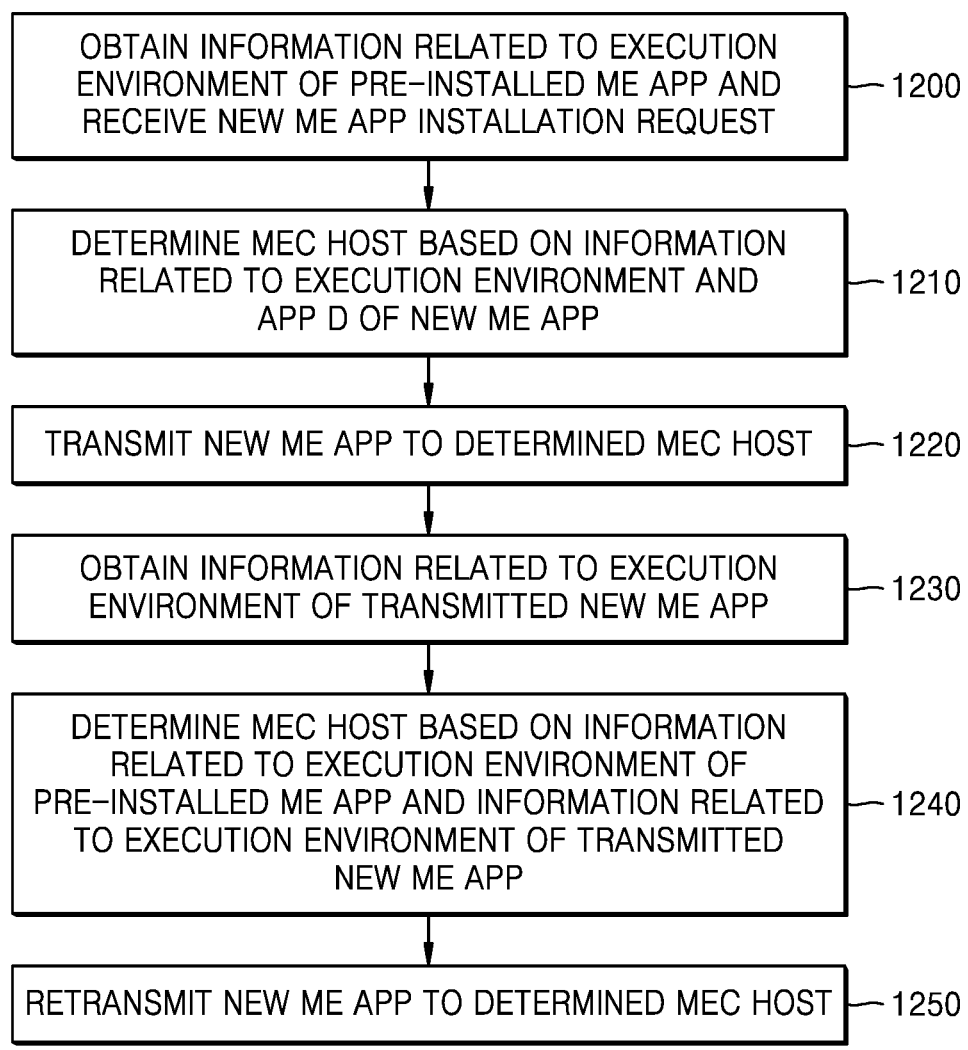
FIG. 12 is a flowchart for describing operations in which an example electronic device retransmits a transmitted new mobile edge (ME) application (app), according to various embodiments.

FIG. 12 is a flowchart for describing operations in which the example electronic device 600 retransmits the new ME app, according to various embodiments. Operations 1200, 1210, and 1220 of FIG. 12 are the same as operations 700, 710, and 720 of FIG. 7. Hereinafter, details about components of FIG. 12, which overlap those in the descriptions of FIG. 7, are briefly described.

In operation 1200, the electronic device 600 may obtain the information 610 related to the execution environment of the pre-installed ME app and receive the new ME app installation request 615. In operation 1210, the electronic device 600 may determine the MEC host 350 for installing the new ME app, based on the information 610 related to the execution environment of the pre-installed ME app and the app D 621 of the new ME app. In operation 1220, the electronic device 600 may transmit the new ME app to the determined MEC host 350 to install the new ME app in the determined MEC host 350.

In operation 1230, the electronic device 600 may obtain the information 620 (FIG. 6) related to the execution environment of the transmitted new ME app 621. As described above, the information 620 related to the execution environment of the transmitted new ME app may include at least one of requirement information (the app D 621) related to the execution environment of the new ME app, transmission history information 622 of the new ME app, information 623 about network congestion of the MEC host 350 of the new ME app, or information 624 about an available resource of the MEC host 350 of the new ME app.

According to an embodiment of the disclosure, because the electronic device 600 may store the information 620 related to the execution environment of the transmitted new ME app, the information 620 related to the execution environment of the transmitted new ME app may not be received from the MEC host 350 or MEPM 392.

In operation 1240, the electronic device 600 may determine the MEC host 350 based on the information 610 related to the execution environment of the pre-installed ME app and the information 620 related to the execution environment of the transmitted new ME app. In operation 1240, the app D 621 of the new ME app of operation 710 is changed to the information 620 related to the execution environment of the transmitted new ME app, and other principles of operation 1240 are the same as operation 710. For example, as described above (refer to the descriptions in FIGS. 7 through 11), the electronic device 600 may determine the MEC host 350 where the transmitted new ME app is to be reinstalled, based on the similarity between the transmitted new ME app and the pre-installed ME app, the stability of the pre-installed ME app with respect to the MEC host 350, or the idle resource of the MEC host 350.

As such, even when the app D 621 of the transmitted new ME app is not revised, the electronic device 600 may determine the suitable MEC host 350 where the transmitted new ME app is to be reinstalled, based on the stability of the pre-installed ME app with respect to the MEC host 350 or the idle resource of the MEC host 350. Also, even when an installation rule for the MEC host 350 based on an app D of an ME app is not added, the electronic device 600 may determine the suitable MEC host 350 based on information related to an execution environment after installation of the ME app (or an actual execution environment), for example, the stability of the pre-installed ME app with respect to the MEC host 350.

In operation 1250, the electronic device 600 may retransmit the new ME app to the determined MEC host 350. According to an embodiment of the disclosure, the electronic device 600 may retransmit the new ME app to the MEPM 392 or MEC host 350 so as to install the new ME app in the determined MEC host 350.

Figure 13:
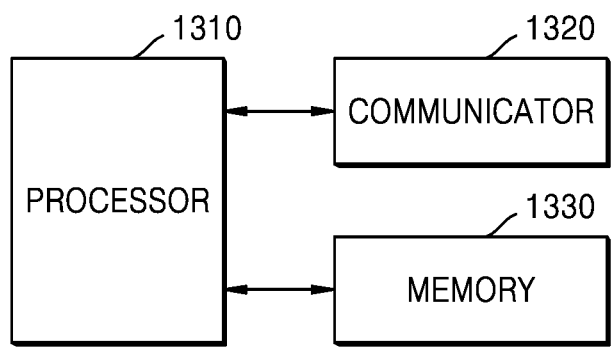
FIG. 13 is a block diagram of an example electronic device according to various embodiments.

FIG. 13 is a block diagram of the example electronic device 600 according to an embodiment of the disclosure.

As shown in FIG. 13, the electronic device 600 according to the disclosure may include a processor 1310, a communicator 1320, and a memory 1330. However, the components of the electronic device 600 are not limited to the components illustrated in FIG. 13. For example, the electronic device 600 may be implemented by more or fewer components than those described above. In addition, the processor 1310, the communicator 1320, and the memory 1330 may be implemented as a single chip.

According to an embodiment, the processor 1310 (e.g., including processing circuitry) may control a series of processes for the electronic device 600 to operate according to an embodiment of the disclosure described above. For example, the components of the electronic device 600 may be controlled such that the electronic device 600 according to an embodiment of the disclosure may determine the suitable MEC host 350. There may be a plurality of processors 1310, and the processor 1310 may execute a plurality of instructions (or programs) stored in the memory 1330 to perform the above-described operations, for example, an operation of determining the suitable MEC host 350. Detailed operations have been described above with reference to FIGS. 7 through 12.

The communicator 1320 (e.g., including communication circuitry) may transmit or receive a signal to or from an external device (for example, the terminal 100), a network (for example, the 3GPP network 200), or a server (for example, the service server 400). The signal transmitted or received by the communicator 1320 may include control information and data. The communicator 1320 may include a radio frequency (RF) transmitter for up-converting and amplifying a frequency of a transmitted signal, and a RF receiver for amplifying low-noise and down-converting a frequency of a received signal. However, this is only an example of the communicator 1320 and components of the communicator 1320 are not limited to the RF transmitter and the RF receiver. Also, the communicator 1320 may receive and output, to the processor 1310, a signal through a wireless channel, and transmit a signal output from the processor 1310 through the wireless channel.

According to an embodiment, the communicator 1320 may transmit or receive data to or from the terminal 100, an external server (not shown), and the service server 400. For example, the communicator 1320 may receive the new ME app installation request 615 from the terminal 100, external server, or service server 400, through the 3GPP network 200.

According to an embodiment, the communicator 1320 may transmit or receive data to or from the MEC host 350 or MEPM 392 according to control by the processor 1310. For example, the communicator 1320 may receive the information 610 related to the execution environment of the pre-installed ME app from the MEC host 350 or MEPM 392, and transmit the new ME app to the determined MEC host 350. According to another embodiment of the disclosure, because the electronic device 600 stores the information 610 related to the execution environment of the pre-installed ME app, the information 610 related to the execution environment of the pre-installed ME app may not be received from the MEC host 350 or MEPM 392.

According to an embodiment, the memory 1330 may store data and a plurality of instructions (or programs) required for operations of the electronic device 600. Also, the memory 1330 may store control information or data included in a signal transmitted or received by the electronic device 600. The memory 1330 may include a storage medium, such as read-only memory (ROM), random access memory (RAM), a hard disk, a CD-ROM, or a DVD, or a combination of storage media. Also, there may be a plurality of the memories 1330. According to an embodiment, the memory 1330 may store a plurality of instructions (or programs) for the electronic device 600 according to an embodiment of the disclosure to determine the suitable MEC host 350.

Methods according to the claims of the disclosure or the embodiments described in the specification may be implemented in hardware, software, or firmware, or a combination of hardware, software and/or firmware.

When the methods are implemented in software, a computer-readable recording medium or computer program product having one or more programs (software modules) recorded thereon may be provided. The one or more programs recorded on the computer-readable recording medium or computer program product are configured to be executable by one or more processors in the electronic device 600 (device). The one or more programs include instructions that enable the electronic device 600 to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). The storage device may be connected through an external port to an apparatus according to the embodiments of the disclosure. Another storage device on the communication network may also be connected to the apparatus performing the embodiments of the disclosure.

In the disclosure, the term "computer program product" or "computer-readable medium" is used to entirely refer to a medium such as a memory, a hard disk installed in a hard disk drive, or a signal. The "computer program product" or "computer-readable medium" provides software configured of instructions for setting a length of a timer for receiving a missing data packet, based on network metrics corresponding to a determined event according to the disclosure, to a computer system.

In the afore-described embodiments of the disclosure, elements included in the disclosure are expressed in a singular or plural form according to specific embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

What is claimed is:

1. An electronic device comprising:
   one or more processors; and
   memory storing one or more programs configured to be executed by the one or more processors and including instructions for controlling the electronic device to perform operations comprising:
   obtaining information related to a first execution environment of at least one installed mobile edge application, wherein the first execution environment information includes change history information regarding a mobile edge computing host where the at least one mobile edge application is installed;
   receiving an installation request for a new mobile edge application, wherein the installation request comprises requirement information related to a second execution environment of the new mobile edge application,
   wherein the first execution environment and the second execution environment enables mobile edge computing services to be consumed by at least one mobile edge application;
   comparing the information related to the first execution environment with the requirement information related to the second execution environment of the new mobile edge application;
   determining, based on a result of the comparing, a mobile edge computing host for installing the new mobile edge application based on the information related to the first execution environment and the requirement information related to the second execution environment of the new mobile edge application; and
   transmitting the new mobile edge application to the determined mobile edge computing host.

2. The electronic device of claim 1, comprising memory storing one or more programs including instructions for controlling the electronic device to perform operations comprising:
   digitizing the information related to the first execution environment and the requirement information related to the second execution environment of the new mobile edge application respectively into data; and
   determining the mobile edge computing host based on the digitized data.

3. The electronic device of claim 2, comprising memory storing one or more programs including instructions for controlling the electronic device to perform operations comprising:
- generating a data comparison list based on the digitized data; and
- determining the mobile edge computing host based on the data comparison list.

4. The electronic device of claim 1, comprising memory storing one or more programs including instructions for controlling the electronic device to perform operations comprising:
- determining stability of the first execution environment of the at least one installed mobile edge application, based on the information related to the first execution environment; and
- determining the mobile edge computing host based on the stability and the requirement information related to the second execution environment of the new mobile edge application.

5. The electronic device of claim 1, comprising memory storing one or more programs including instructions for controlling the electronic device to perform operations comprising:
- determining an idle resource of a mobile edge computing host of the at least one installed mobile edge application, based on the information related to the first execution environment; and
- determining the mobile edge computing host based on the idle resource and the requirement information related to the second execution environment of the new mobile edge application.

6. The electronic device of claim 1, comprising memory storing one or more programs including instructions for controlling the electronic device to perform operations comprising:
- obtaining information related to a third execution environment of the transmitted new mobile edge application;
- determining a mobile edge computing host for reinstalling the new mobile edge application, based on the information related to the first execution environment of the at least one installed mobile edge application and the information related to the third execution environment of the transmitted new mobile edge application; and
- retransmitting the new mobile edge application to the determined mobile edge computing host.

7. The electronic device of claim 1,
wherein the determining the mobile edge computing host for installing the new mobile edge application comprises:
- determining a stability of the first execution environment based on the change history information; and
- determining the mobile edge computing host for installing the new mobile edge application based on the stability of the first execution environment.

8. A method, performed by an electronic device, of transmitting a mobile edge application, the method comprising:
- obtaining information related to a first execution environment of at least one mobile edge application, wherein the first execution environment information includes change history information regarding a mobile edge computing host where the at least one mobile edge application is installed;
- receiving an installation request for a new mobile edge application, wherein the installation request comprises requirement information related to a second execution environment of the new mobile edge application,
- wherein the first execution environment and the second execution environment enables mobile edge computing services to be consumed by at least one mobile edge application;
- comparing the information related to the first execution environment with the requirement information related to the second execution environment of the new mobile edge application;
- determining, based on a result of the comparing, a mobile edge computing host for installing the new mobile edge application, based on the information related to the first execution environment and the requirement information related to the second execution environment of the new mobile edge application; and
- transmitting the new mobile edge application to the determined mobile edge computing host.

9. The method of claim 8, comprising:
- digitizing the information related to the first execution environment and the requirement information related to the second execution environment of the new mobile edge application respectively into data; and
- determining the mobile edge computing host based on the digitized data.

10. The method of claim 9, comprising:
- generating a data comparison list based on the digitized data; and
- determining the mobile edge computing host based on the data comparison list.

11. The method of claim 8, comprising:
- determining stability of the first execution environment of the at least one installed mobile edge application, based on the information related to the first execution environment; and
- determining the mobile edge computing host based on the stability and the requirement information related to the second execution environment of the new mobile edge application.

12. The method of claim 8, comprising:
- determining an idle resource of a mobile edge computing host of the at least one installed mobile edge application, based on the information related to the first execution environment; and
- determining the mobile edge computing host based on the idle resource and the requirement information related to the second execution environment of the new mobile edge application.

13. The method of claim 8, comprising:
- obtaining information related to a third execution environment of the transmitted new mobile edge application;
- determining a mobile edge computing host for reinstalling the new mobile edge application, based on the information related to the first execution environment of the at least one installed mobile edge application and the information related to the third execution environment of the transmitted new mobile edge application; and
- retransmitting the new mobile edge application to the determined mobile edge computing host.

14. One or more non-transitory computer-readable recording media having recorded thereon one or more programs, the one or more programs comprising instructions which, when executed by one or more processor, cause the one or more processors to perform operations comprising:
- obtaining information related to a first execution environment of at least one mobile edge application, wherein the first execution environment information includes change history information regarding a mobile edge computing host where the at least one mobile edge application is installed, receiving an installation request for a new mobile edge application, wherein the installation request comprises requirement information related to a second execution environment of the new mobile edge application, wherein the first execution environment and the second execution environment enables mobile edge computing services to be consumed by at least one mobile edge application;

comparing the information related to the first execution environment with the requirement information related to the second execution environment of the new mobile edge application;

determining, based on a result of the comparing, a mobile edge computing host for installing the new mobile edge application, based on the information related to the first execution environment and the requirement information related to the second execution environment of the new mobile edge application; and transmitting the new mobile edge application to the determined mobile edge computing host.

15. The non-transitory computer-readable medium of claim 14, wherein the one or more processors perform the operations in an electronic device.

16. The non-transitory computer-readable medium of claim 15, wherein the electronic device comprises a server.

\* \* \* \* \*